(12) United States Patent
Jain et al.

(10) Patent No.: US 9,571,536 B2
(45) Date of Patent: Feb. 14, 2017

(54) CROSS DEVICE TASK CONTINUITY

(71) Applicant: Microsoft Technology Licensing, LLC, Redmond, WA (US)

(72) Inventors: Raju Jain, Woodinville, WA (US); Hagen Green, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 133 days.

(21) Appl. No.: 14/472,914

(22) Filed: Aug. 29, 2014

(65) Prior Publication Data
US 2016/0065626 A1    Mar. 3, 2016

(51) Int. Cl.
| | |
|---|---|
| *G06F 17/00* | (2006.01) |
| *G06N 5/02* | (2006.01) |
| *H04L 29/06* | (2006.01) |
| *G06F 9/48* | (2006.01) |
| *G06Q 10/10* | (2012.01) |
| *G06F 17/30* | (2006.01) |
| *H04L 29/08* | (2006.01) |

(52) U.S. Cl.
CPC ........ *H04L 65/403* (2013.01); *G06F 9/4856* (2013.01); *G06F 17/30873* (2013.01); *G06Q 10/10* (2013.01); *G06Q 10/101* (2013.01); *H04L 67/10* (2013.01); *H04L 67/306* (2013.01)

(58) Field of Classification Search
CPC combination set(s) only.
See application file for complete search history.

(56) References Cited

U.S. PATENT DOCUMENTS

| | | | |
|---|---|---|---|
| 7,318,063 B2 * | 1/2008 | Brychell | ........... G06F 17/30917 |
| | | | 707/954 |
| 9,119,156 B2 * | 8/2015 | Green | ............... H04W 52/0258 |
| 2007/0021216 A1 | 1/2007 | Guruparan | |

(Continued)

OTHER PUBLICATIONS

Operating mechanism for device cooperative content on ubiquitous networks Y. Kidawara; K. Zettsu Creating, Connecting and Collaborating through Computing, 2004. Proceedings. Second International Conference on Year: 2004 pp. 54-61, DOI: 10.1109/C5.2004.1314369 IEEE Conference Publications.*

(Continued)

*Primary Examiner* — Michael B Holmes
(74) *Attorney, Agent, or Firm* — Aaron Chatterjee; Dan Choi; Micky Minhas

(57) ABSTRACT

Systems and methods for cross device and/or cross operating system task continuity between devices for frictionless task engagement and reengagement. Task continuity can provide for simple detection and selection of recently viewed and/or modified tasks. Task continuity can provide for simple engagement of new tasks in applications and/or websites, the new tasks being related to recently presented and/or modified tasks. Responsive to selection of the recently presented and/or modified task, the task can be seamlessly reengaged from the point at which it was last presented and/or modified. Responsive to selection of a new task, the task can be engaged from a starting point. Upon completion of the task on one device, the task can be closed across devices. Task continuity can be enabled on a single device or across a plurality of devices. Task continuity can be enabled on a single operating system, or across a plurality of operating systems.

20 Claims, 8 Drawing Sheets

(56) References Cited

U.S. PATENT DOCUMENTS

| | | |
|---|---|---|
| 2007/0136392 A1 | 6/2007 | Oh et al. |
| 2009/0204966 A1 | 8/2009 | Johnson et al. |
| 2013/0041790 A1 | 2/2013 | Murugesan et al. |
| 2014/0059566 A1 | 2/2014 | Benedek et al. |
| 2014/0094272 A1 | 4/2014 | Kelly et al. |
| 2014/0115032 A1 | 4/2014 | Chanderraju et al. |
| 2014/0143196 A1 | 5/2014 | White et al. |

OTHER PUBLICATIONS

"International Search Report & Written Opinion Issued in PCT Application No. PCT/US2015/046623", Mailed Date: Nov. 19, 2015, 15 Pages.

"Folloyu—What do we do?", Published on: Mar. 13, 2012, Available at: https://www.folloyu.com/about.html, 5 pages.

Hanssen, et al., "Cross-Device Application Mobility", Published on: Jul. 28, 2014, Available at: http://www.diva-portal.org/smash/get/diva2:662059/FULLTEXT01.pdf, 85 pages.

Hanssen, et al., "Cross-Device Application Mobility", Published on: Jul. 28, 2014, Available at: http://www.diva-portal.org/smash/get/diva2:662059/FULLTEXT01.pdf, 84 pages.

Paterno, et al., "Ambient Intelligence for Supporting Task Continuity across Multiple Devices and Implementation Languages", In Proceedings of the Computer Journal, Mar. 13, 2009, 19 pages.

"Ooyala—Player Developer Guide", Retrieved on: Jul. 28, 2014, Available at: http://support.ooyala.com/sites/all/libraries/dita/devs/en/pdf/player-dg.pdf, 68 pages.

Protalinski, Emil, "Xbox Video can now resume playing on other devices, SmartGlass navigation improved, and next One update detailed", Published on: Apr. 1, 2014, http://thenextweb.com/microsoft/2014/04/01/xbox-video-can-now-resume-playing-devices-smartglass-navigation-improved-next-one-update-detailed/, 4 pages.

\* cited by examiner

CROSS DEVICE TASK CONTINUITY

BACKGROUND

Devices, such as smartphones, personal computers, tablets, two-in-one devices, etc. are ubiquitous in society. People use these devices for multiple different functions, each function being potentially executed on a different application or website accessed via the device. Often times, people own more than one device, each replete with multiple applications and providing access to websites.

Devices, however, generally lack the capability to seamlessly share information about tasks in progress between one another. Any sharing between devices requires an explicit save and transfer between devices. Thus, when a user picks up a second device to continue a task, the generally has to spend extra time attempting to find the desired application, and even more time determining where the user left off on the task, if that is even possibility.

SUMMARY

This disclosure describes systems and methods for task continuity with an emphasis on allowing a user to easily detect where they last viewed and/or modified a particular task, including on another device. Task continuity provides frictionless engagement and reengagement of tasks in order to deliver high value application and website use and task resumption, thereby resulting in greater user satisfaction. Task continuity is enabled on a single device and/or across a plurality of devices. Likewise, task continuity is enabled on a single operating system, and/or across a plurality of operating systems.

In some examples, a user performing a task in an application on a first device may pause the task in the application. At that time, or at a time in the future, the user may wake up a second device. Responsive to awakening, the second device can provide the user the option to continue the task from the point at which it was paused on the first device. In various examples, the user can perform a task in an application on a first device, and can pick up a second device and perform the task on the second device simultaneously with the task on the first device. In some examples, the user can perform a task in an application on a first device, and can pick up a second device and perform a second task on the second device that is associated with the task on the first device.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
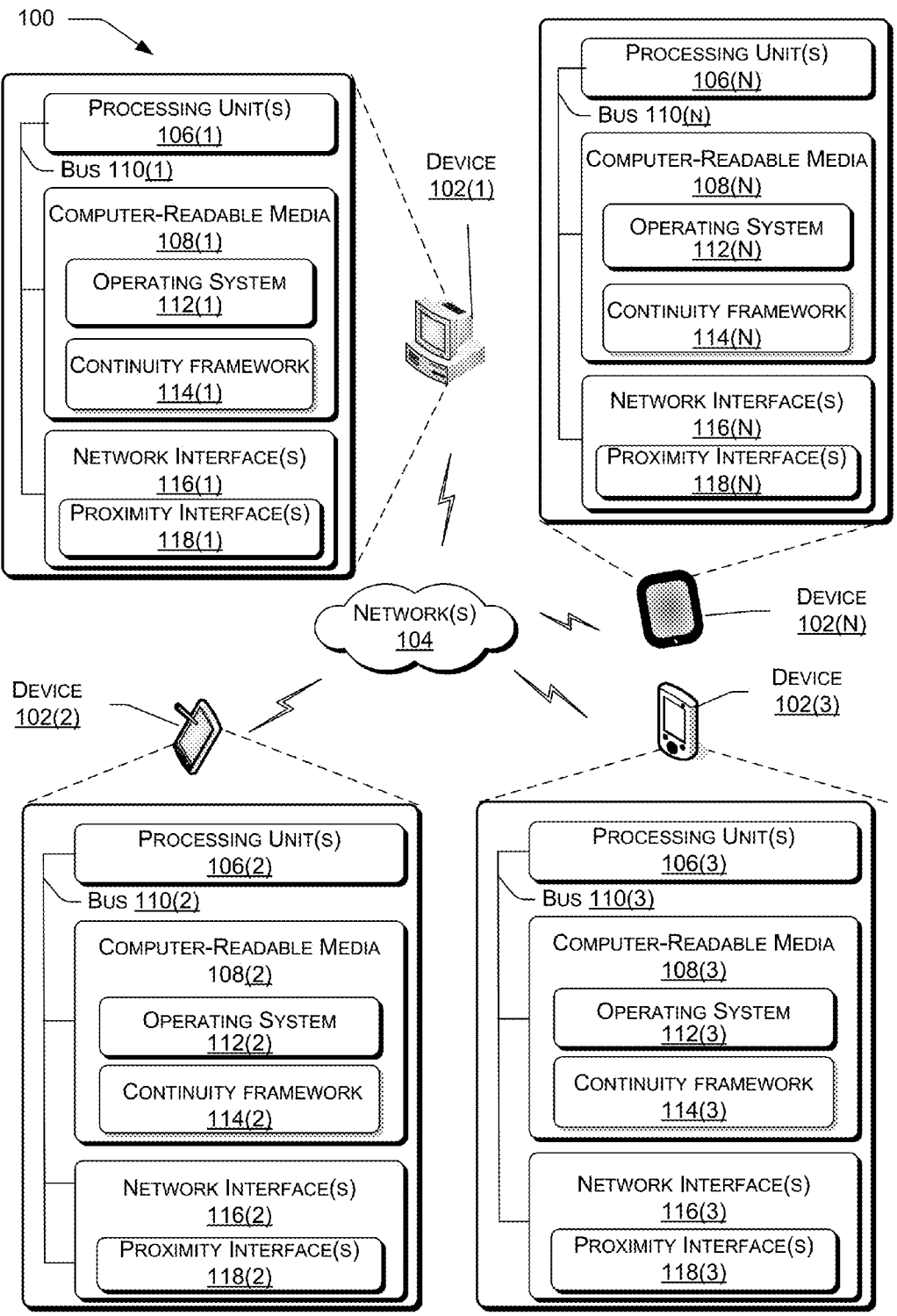
FIG. 1 illustrates an example environment of a cross device and/or cross operating system task continuity system.

Cross device and/or cross operating system task continuity ("task continuity") can provide ease of discovery and frictionless engagement and reengagement of tasks so that users can seamlessly execute tasks across devices and/or operating systems, regardless of device type or operating system.

This disclosure describes methods and systems that enable easy discovery and the ability to continue tasks seamlessly across devices and/or operating systems. A task can include a particular activity a user does on an application and/or a website, such as listening to a song or playlist, reading a news article, writing a document, or a myriad of other activities. Task continuity, as described herein, can be interactive. Task continuity, as described herein, can allow a user to easily discover one or more previously viewed and/or modified tasks in at least one of a plurality of applications and/or websites. The discovery of the one or more previously viewed and/or modified tasks can occur on one device, or on multiple active devices configured for a user. As used herein, an active device is a device which is discoverable over a network.

Discoverability of devices can be based on a device being powered on, off sleep mode, off airplane mode, and/or any other action that causes the device to become available over a network. The availability over a network can be determined by Wi-Fi sensors, Bluetooth™ sensors, proximity sensors, wired connections, and/or any other sensors capable of detecting network interfaces.

Task continuity can provide a way for a user to select a particular task of the one or more previously viewed and/or modified tasks. Responsive to the selection, the particular task can be reengaged at the point in which the task was last viewed and/or modified. In some examples, task continuity can provide the user a way to resume the particular task in a different application. In various examples, task continuity can provide the user a way to resume the particular task in a web browser. In some examples, task continuity can provide the user a way to select to engage in a new task based on application and/or website specific information provided to the user based at least upon previously viewed tasks.

Task continuity provides the user with a rich reengagement of tasks. In at least one example, the rich reengagement can provide the user with task context data related to the most recent user inputs and/or actions in one or more tasks. In some examples, the application and/or website may provide the user with other options related to application or website specific data associated with the one or more tasks. For example, an application on a smart television can display recorded or live programming, and the application on a smartphone or another secondary device can provide information about the recorded or live programming. In some examples, the application on the smartphone, or another secondary device, can provide application specific options of the recorded or live programming, such as live voting for the best singer on a talent show, etc.

In task continuity at least one device is configured to a user profile. In at least one example, the device configured on the user profile is connected to a distributed service platform, such as the Cloud, in which task context data for the tasks on applications and/or websites is saved to a reference user profile in the distributed service platform. The reference user profile can serve as a central reference point of user profile data for at least one of a plurality of devices in task continuity.

Task context data can include the time the task was last viewed and/or modified, the number of times the task has been viewed and/or modified, text, device display information, images, and any other data in applications and/or on websites. In some examples, a cross device activity module on the reference user profile in the distributed service platform can periodically pull task context data from one or more active devices and/or the cross device activity module on the reference user profile in the distributed service platform. In various examples, a cross device activity module on the reference user profile in the distributed service platform can periodically receive task context data pushed from the one or more active devices. The cross device activity module can pull and/or the one or more active devices can push the most recent task context data every 5 seconds, 10 seconds, or any other period of time. The cross device activity module can save the task context data to the corresponding application and/or website on the user profile.

In various examples, an active device can cause the task context data to be sent to the reference user profile in the distributed service platform by pushing an update from the active device via the network connection. The task context data can be stored in the distributed service platform for easy access at any time on any device configured to the user profile and capable of accessing the distributed service platform.

Task continuity can also use a proximity network to update data between devices. The proximity network can be peer-to-peer, wireless USB, Bluetooth, IrDA, Z-Wave, body area, or any other wired or wireless path based on the proximity of at least two devices. Proximity can be determined by wired connections and/or proximity sensors. In a proximity network, the at least two devices can share task context data between devices, such that a task being presented and/or modified on a first device can be identified by a second device in proximity, and the second device can display the task context data from the task on the first device. Thus, presentation and/or modification of the task on the first device can stop, and the task can be seamlessly resumed on the second device where it left off on the first device. In some examples, responsive to the first device and the second device being in proximity to one another, the task context data can be available on the first device and the second device concurrently.

In some examples, a proximity network can allow explicit sending of the task context data of one or more previously viewed and/or modified tasks between devices. In some examples, the transfer of the task context data may be implicit, such that in response to the first device and the second device being in proximity to each other, the second device pulls the task context data of one or more previously presented and/or modified tasks from the first device.

In some examples, task continuity can also update data between devices using a distributed service platform, a proximity network, and/or a combination of a distributed service platform and a proximity network, in order to provide rich task reengagement.

Task continuity can also be enabled across devices with different operating systems. For example, a first device may be configured to run on a WINDOWS operating system, and it may transmit and receive user profile data with a second device configured to run on a LINUX, ANDROID operating system, an iOS™ operating system, or another operating system.

Illustrative Environment

The environment described below constitutes but one example and is not intended to limit the claims to any one particular operating environment. Other environments can be used without departing from the spirit and scope of the claimed subject matter.

Cross device and/or cross operating system task continuity allows continuation of a task without interruption, across devices or on multiple devices simultaneously. A task can include a particular activity the user does on an application and/or website on a device, such as listening to a song or playlist, reading a news article, writing a document, or a myriad of other activities. For example, a user may be listening to a playlist on a desktop computer, and may need to leave the location of the desktop computer. The user can pick up a smartphone and continue listening to the same playlist on the smartphone, beginning play on the smartphone where it left off on the desktop. In another example, the user can listen to the same playlist on the desktop and smartphone simultaneously, with both devices playing the playlist at the same time. In another example, the user can pick up a smartphone and receive information to supplement the playlist while continuing to listen to the playlist on the desktop.

FIG. 1 shows an example environment 100 of the cross device and/or cross operating system task continuity system. Device(s) 102 and/or components of environment 100 can include a diverse variety of device types configured to communicate via one or more networks 104, and are not limited to any particular type of device. In some examples, device(s) 102, such as 102(1) can include stationary devices, including but not limited to servers, desktop computers, personal computers, network-enabled televisions, terminals, game consoles, set-top boxes, gaming devices, work stations, and thin clients, such as those capable of operating a distributed computing resource. In some examples, device (s) 102, such as 102(2), can include mobile devices, including but not limited to mobile phones, tablet computers, mobile phone tablet hybrids, personal data assistants (PDAs), laptop computers, media players, personal video recorders (PVRs), cameras, and any other mobile computers or any other mobile telecommunication devices. In some examples, device(s) 102, such as 102(3), can include embedded devices, including but not limited to wearable computers, implanted computing devices, automotive computers, computer navigation type devices, such as satellite-based navigation systems including global positioning system (GPS) devices and other satellite-based navigation system devices, appliances, and integrated components for inclusion in a computing device. In various examples, device(s) 102, such as device 102(N), can include any other sort of computing device configured to communicate via one or more network(s) 104.

For example, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), personal area networks (PANs), body area networks (BANs), near field communication (NFC), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). The examples which support connectivity through WAPs send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

Device(s) 102 can include any computing device having one or more processing unit(s) 106 operably connected to computer-readable media 108 such as via a bus 110, which in some instances can include one or more of a system bus, a data bus, an address bus, a PCI bus, a Mini-PCI bus, and any variety of local, peripheral, and/or independent buses. Executable instructions stored on computer-readable media 108 can include, for example, an operating system 112, a continuity framework 114, and other modules and programs that are loadable and executable by processing units(s) 106.

The operating system 112 on device(s) 102 can be any operating system including but not limited to MICROSOFT WINDOWS, WINDOWS PHONE, QNX™, IBM z/OS™, LINUX, ANDROID, iOS™, OS X™, NETBSD™, or any other operating system capable of managing computer hardware and software resources. In some examples, devices 102(1) and 102(2) can include operating system 112, such as Microsoft Windows. In various examples, device 102(1) can include operating system 112(1), such as a MICROSOFT WINDOWS, while device 102(2) can include operating system 112(2), such as ANDROID.

Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

Device(s) 102 can also include one or more network interface(s) 116 to enable communications between device 102(1) and other networked devices involved in task continuity such as devices 102(2)-102(N). Such network interface(s) 116 can include one or more network interface controllers (NICs) or other types of transceiver devices to send and receive communications over a network. For example, network interface(s) 116 can include proximity interface(s) 118 to further enable communications between device(s) 102(1) and other networked devices involved in task continuity, such as devices 102(2)-102(N). Such proximity interface(s) 118 can include one or more proximity network interface controllers or other types of transceiver devices to send and receive communications over a proximity network.

Figure 2:
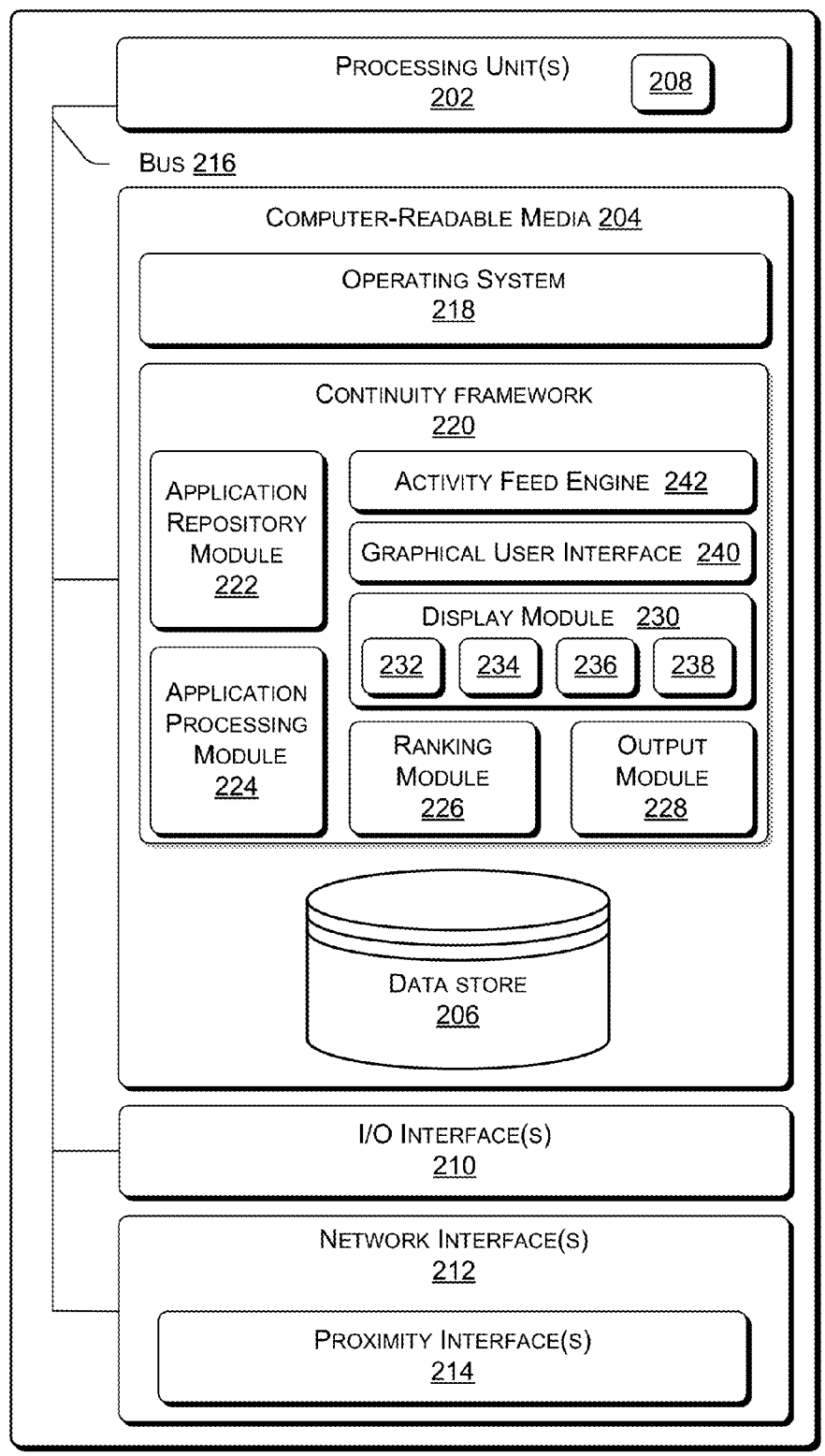
FIG. 2 illustrates an example device including a cross device and/or cross operating system task continuity system consistent with FIG. 1 in more detail.

FIG. 2 illustrates an example device 200 including a cross device and/or cross operating system task continuity system, such as a device 102 from FIG. 1. In device 200, processing unit(s) 202 can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In some examples, device 200 can be one of a plurality of devices, such as devices 102(1), 102(2), and 102(N), which are part of a distributed service platform (e.g. the Cloud). In some examples, device 200 can be one of a plurality of devices which are capable of connection via a proximity network. In at least one example, device 200 can be one of a plurality of devices which are both part of a distributed service platform and capable of connection via a proximity network.

In some examples, computer-readable media 204, which can be computer-readable media 108, can store instructions executable by the processing unit(s) 202. Computer-readable media 204 can also store instructions executable by external processing units such as by an external CPU, an external GPU, and/or executable by an external accelerator, such as an FPGA type accelerator, a DSP type accelerator, or any other internal or external accelerator. In some examples at least one CPU, GPU, and/or accelerator is incorporated in device 200, while in other examples one or more of a CPU, GPU, and/or accelerator can be external to device 200.

In the illustrated example, computer-readable media 204 also includes a data store 206. In some examples, data store 206 includes data storage such as a database, data warehouse, or other type of structured or unstructured data storage. In some examples, data store 206 includes a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example. Data store 206 can store data for the operations of processes, applications, components, and/or modules stored in computer-readable media 204 and/or executed by processing unit(s) and/or accelerator(s) 202. Alternately, some or all of the above-referenced data can be stored on separate memories 208 on board one or more processing unit(s) 202 such as a memory on board a CPU-type processor, a GPU-type processor, an FPGA-type accelerator, a DSP-type accelerator, and/or another accelerator.

Device 200 can further include one or more input/output (I/O) interfaces 210 to allow device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in device 200, network interface(s) 212, which can be network interface(s) 116, can represent, for example, network interface controllers (NICs) or other types of transceiver devices to send and receive communications over a network. Network interface(s) 212 can also include one or more proximity interface(s) 214, which can further include hardware and software to communicate via a proximity network, to further enable communications with other devices involved in task continuity, such as devices 102(1)-102(N).

In the illustrated example, device 200 can operably connect the processing unit(s) 202 to computer-readable media 204, I/O interface(s) 210, and network interface(s) 212 via a bus 216, which corresponds to bus 110. In some examples, bus 216 can include one or more of a system bus, a data bus, an address bus, a PCI bus, a Mini-PCI bus, and any variety of local, peripheral, and/or independent buses.

In the illustrated example, computer-readable media 204 also includes an operating system 218, which can be operating system 112. The operating system can be any operating system including but not limited to MICROSOFT WINDOWS, WINDOWS PHONE, QNX™, IBM z/OS™, LINUX, ANDROID, iOS™, OS X™, NETBSD™, or any other operating system capable of managing computer hardware and software resources on device 200. Computer-readable media 204 also includes a continuity framework 220, which can be continuity framework 114. Continuity framework 220 can include one or more modules and/or APIs, which are illustrated as blocks 222, 224, 226, 228, 230, 232, 234, 236, 238, 240, and 242, although this is just an example, and the number can vary higher or lower.

Functionality described associated with blocks 222, 224, 226, 228, 230, 232, 234, 236, 238, 240, and 242 can be combined to be performed by a fewer number of modules and/or APIs, or it can be split and performed by a larger number of modules and/or APIs. For example, block 222 can represent an application repository module with logic to program processing unit 202 of device 200 for extraction of data, including but not limited to task context data, and application and/or website specific data from data store 206 or an external data store. In some examples, the application repository module 222 can further include logic to distinguish between task context data associated with device 200 and/or task context data associated with other devices, such as devices 102(1)-102(N). In various examples, the application repository module 222 can further include logic to distinguish between tasks which have been previously presented and/or modified on device 200.

In the illustrated example, continuity framework 220 can include an application processing module 224. In some examples, application processing module 224 includes logic to program processing unit 202 of device 200 for extraction of compatibility data from a data storage, such as the application repository module 222, the data store 206, and/or an external data store. Compatibility data includes but is not limited to, application compatibility with at least one of a plurality of other applications such that the applications may share context data, and/or application compatibility with at least one of a plurality of corresponding websites. In some examples, application processing module 224 can include logic to program processing unit 202 for extraction of other application and/or website specific data, including by not limited to application suggested user actions, application promotions, or any other data programmed in the application to be provided from data storage, such as the application repository module 222, the data store 206, and/or an external data store.

Continuity framework 220 can further include a ranking module 226 with logic to program the processing unit(s) 202 for extraction of application and/or website use data from data storage, such as the application repository module 222, the data store 206 and/or an external data store. Application and/or website use data can include at least the popularity (frequency of use) of at least one of a plurality of applications and/or websites, the time in which one or more tasks in a plurality of applications and/or websites was viewed and/or modified, the duration of viewing at least one of a plurality of applications and/or websites, and the type of application and/or website. Ranking module 226 can also include logic to program the processing unit(s) 202 for extraction of user preference data (i.e. device settings, application settings, website settings, and the like) from data storage.

The ranking module 226 can also include ranking logic to rank at least one of applications, websites, tasks in applications, and/or tasks in websites, based at least in part on application and/or website use data, and/or user preferences (i.e. device settings, application settings, website settings, and the like). The ranking module 226 can further include logic to save the ranking to the user profile in data storage, such as application repository module 222, data store 206, and/or external data store. In some examples, the ranking logic in ranking module 226 can rank based on one or more of time since last viewing and/or modifying, frequency of viewing and/or modification, type of application and/or website, and/or user preferences.

In the illustrated example, continuity framework 220 can further include an output module 228 with logic to program processing unit 202 to extract data from at least one of the ranking module 226, the application processing module 224, or data storage, such as the application repository module 222, the data store 206, and/or an external data store, for outputting relevant context data from applications and/or tasks in applications to a display module 230. The output module 228 can further include logic to determine the most relevant context data from applications and/or tasks based at least one of user preferences, application ranking, website ranking, task ranking, application suggested user actions, and application promotion. Based on this insight, task continuity can provide the most relevant context data to the display module 230, which can inform the selection of the user.

In some examples, the display module 230 includes logic to present relevant task context data, application and/or website specific data, application suggested user actions, and/or application promotions, on one or more interactive display thumbnails 232, 234, 236, and 238, although this is just an example, and the number can be vary higher or lower. In one example, interactive display thumbnail 232 can display the most recently viewed and/or modified task in a first application, while interactive display thumbnail 234 can display the most recently viewed and/or modified task in a second application. Additionally, interactive display thumbnails 234 and 236 can display application promotions for the first and second applications, respectively.

The continuity framework 220 can further include a graphical user interface 240 and an activity feed engine 242. The graphical user interface can include logic to respond to input via the I/O interface(s) 210. The graphical user interface 240 can further include logic to program an activity feed engine 242 to launch a task in an application and/or website. In some examples, the task launch can be based at least in part on user input on one or more interactive display thumbnails 232, 234, 236, and 238. The graphical user interface 240 can be activated by at least one of a touch input, a pen input, a mouse click, a keyboard selection, or any other input mechanism. Responsive to receiving an indication of selection of an interactive display thumbnail, such as interactive display thumbnail 232, the graphical user interface 240 enables the launch of the displayed application and task therein via the activity feed engine 242, and presentation and/or modification of the task can continue.

The graphical user interface 240 can further include logic to program the activity feed engine to send data in an explicit push across any number of devices and/or to a cross device activity module in a distributed service platform. The graphical user interface 240 can further include logic to program the activity feed engine to save data in an explicit save based at least in part on input via the I/O interface(s) 210.

Activity feed engine 242 can include logic to program the processing unit(s) 202 to save task context data for a task in an application and/or website while the task is being viewed and/or modified on device 200. The activity feed engine can save the task context data to data storage, such as application repository module 222, data store 206, and/or an external data source. Task context data can be saved to a user profile in the data storage, thereby updating the user profile data. In some examples, activity feed engine 242 can also include logic to program the processing unit(s) 202 to extract the user profile data from data storage and send the user profile data to another device and/or the distributed service platform.

In some examples, the user profile data can be saved in data storage on one device. In some examples, the user profile data can be saved across at least two devices. In various examples, the user profile data can be saved in a reference user profile in a distributed service platform. In at least one example, the user profile data can be saved in data storage across one or more devices and in the reference user profile in the distributed service platform.

In some examples, the activity feed engine 242 can save user profile data, including task context data, in an explicit update via graphical user interface 240. In an explicit update, responsive to receiving a signal to push data, the activity feed engine extracts user profile data from data storage and sends it via the network interface(s) 212 to another device, such as device 102(N). In various examples, the update of the user profile data can be an implicit update, such that in response to a first device and a second device being connected in a proximity network, the activity feed engine of second device, such as device 102(N), can pull user profile data via the network interface(s) 212 from the data storage of a first device.

Figure 3:
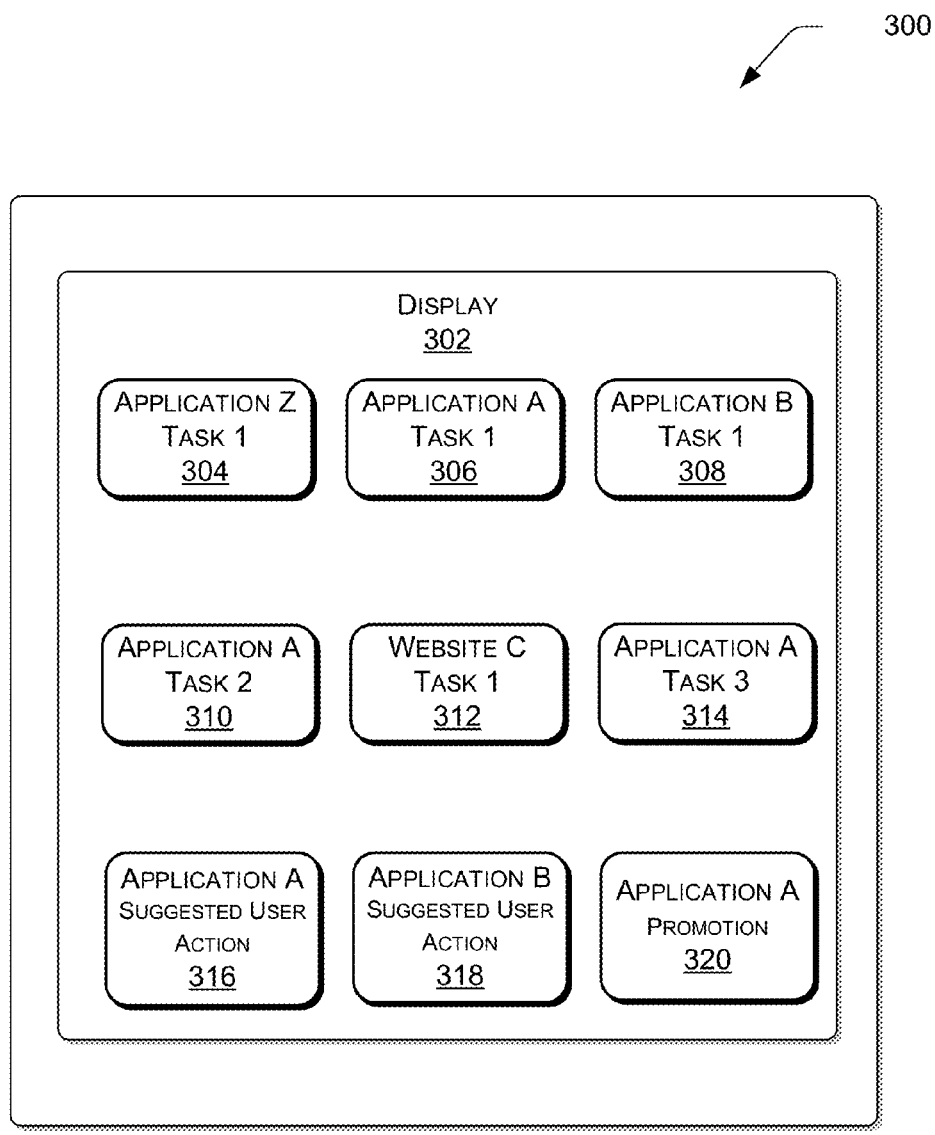
FIG. 3 illustrates an example display module on a device including a cross device and/or cross operating system task continuity system consistent with the preceding figures.

FIG. 3 illustrates an example display module on a device including the cross device and/or cross operating system task continuity system, such as device 102(1) from FIG. 1. Device 300 can include a display 302 for the presentation of data. The data presented on display 302 can be generated by at least a display module, such as display module 230. Display 302 can enable a rich engagement or reengagement of applications, websites, tasks on applications and/or websites, or application specific activities, including but not limited to application suggested user actions and application promotions.

In the illustrated example, display 302 can include interactive display thumbnails 304, 306, 308, 310, 312, 314, 316, 318, and 320, although this is just an example, and the number can vary higher or lower. Display 302 can be operably connected to a display module, such as display module 230, in a continuity framework, such as continuity framework 220. In some examples, display module 302 receives data for display from an output module for display on interactive display thumbnails 304, 306, 308, 310, 312, 314, 316, 318, and 320. In such examples, the output module can determine the most relevant task context data from applications and/or websites based at least in part on user preferences, application and/or task ranking, application suggested user actions, and/or application promotion. Responsive to determining the most relevant task context data, the output module can send the task context data to the display module for presentation. Based on this insight, display 302 can display the most relevant context data and/or other application data related to applications and/or tasks with which the user may like to engage or reengage. The task context data and/or other application and/or website data displayed on each interactive display thumbnail can provide sufficient data regarding the task, application and/or website to enable the user to make an informed selection.

In the illustrated example, blocks 304, 306, 308, 310, 312, and 314 can represent ranked tasks in a user profile. Cross device and/or cross operating system task continuity can rank based on one or more of time since last viewing and/or modifying, frequency of viewing and/or modification, duration of viewing and/or modification, type of application and/or website, and/or user preferences. As an illustrative example, if a user spends two hours composing an email without sending it and subsequently spends five minutes reviewing a news article, the email can be ranked higher than the news article based at least in part on the time spent in the composition.

In some examples, display 302 can include a higher or lower number of interactive display thumbnails with ranked tasks in applications and/or websites, such as interactive display thumbnail 304. In some examples, display 302 can include a higher or lower number of interactive display thumbnails with application specific data, such as interactive display thumbnail 316.

Block 304 can represent the highest ranked task on a user profile. For example, block 304 can represent the most recently viewed and/or modified task in application Z on any device configured for a user profile, such as devices 102(1)-102(N). In another example, block 304 can represent a favorite task as identified by frequency of use and/or as designated by a user in user preferences.

Block 312 can represent the fifth most recently viewed and/or modified task in a user profile, and the most recently viewed and/or modified task on a website, such as website C.

In the illustrated example, blocks 306, 308, 310, 312, and 314 can represent the second through the sixth highest ranked tasks in a user profile. In some examples, the displayed tasks can represent recently presented and/or modified tasks in different applications and/or websites. In some examples, the displayed tasks can represent recently presented and/or modified tasks in same website and/or different websites. For example, block 306, task 1 in application A, can represent the second most recently presented and/or modified task on a user profile, and the most recently presented and/or modified task in application A. Block 310, task 2 in application A, can represent the fourth most recently presented and/or modified task on a user profile, and the second most recently presented and/or modified task in application A. Block 314, task 3 in application A, can represent the sixth most recently presented and/or modified task on a user profile, and the third most recently presented and/or modified task application A. In some examples, application A can represent an email application, and tasks 1, 2, and 3 can represent three different email compositions. Display 302, via the graphical user interface, can enable selection of which of the emails to further view and/or modify.

As another illustrative example, application A can represent a video service, and tasks 1, 2, and 3 can represent three different movies recently presented through the video service on a user profile. Display 302 can enable selection of one of the three movies for continued presentation. A suggested user action can be provided, as illustrated in block 316. The suggested user action can be, for example, a fourth movie suggested by the video service on the user profile, a request for a user survey of each of the three recently viewed movies on the user profile, or any other application specific action on the user profile.

In some examples, interactive display thumbnails 306, 310 and 314 can display sufficient task context data for distinguishing between task 1, task 2, and task 3 in application A in order to allow the user to make an informed decision on selection. In various examples, task context data presented for display can include application title, task title, and/or time the task was last viewed.

In the illustrative example, blocks 316, 318, and 320 can include application specific data such as suggested user action from application A as illustrated in interactive display thumbnail 316, suggested user action from application B as illustrated in interactive display thumbnail 318, and application promotion for application A as illustrated in interactive display thumbnail 320. The application specific data can include suggested user action, and/or application promotions, for the user to engage in tasks relating to use or recently viewed applications and/or websites. As an illustrative example, an application on a smart television can display a live or recorded programming, and the application on a smartphone or another secondary device can provide information about the programming. In some examples, the application on the smartphone, or another secondary device, can provide a suggested user action related to the programming, such as live voting for the best singer on a talent show, etc.

In some examples, interactive display thumbnails 304, 306, 308, 310, 312, 314, 316, 318, and 320 can allow a selection of at least one of a task, application, and/or website for engagement or reengagement of a task through a graphical user interface, such as graphical user interface 240. Responsive to receiving selection of at least one of a plurality of interactive display thumbnails, device 300 can launch the selected application and/or website for task engagement or reengagement.

Figure 4:
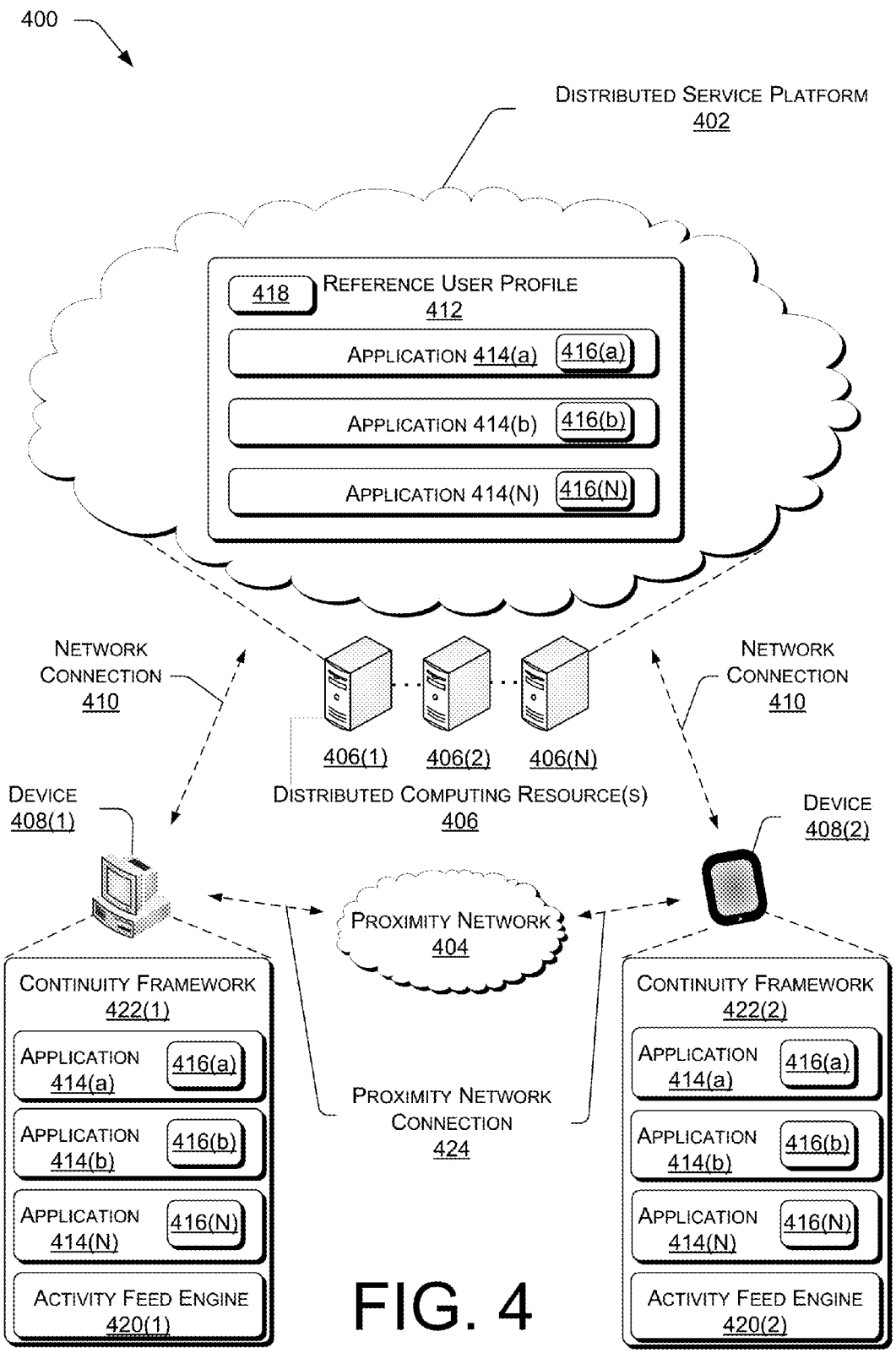
FIG. 4 illustrates an example network environment of the cross device and/or cross operating system task continuity system consistent with the preceding figures.

FIG. 4 illustrates an example network environment of the cross device and/or cross operating system task continuity system consistent with the preceding figures. Network environment 400 can include a distributed service platform 402 and/or a proximity network 404.

A distributed service platform 402 can include one or more distributed computing resource(s) 406, such as distributed computing resources 406(1)-406(N). Examples support scenarios where distributed computing resource(s) 406 can include one or more computing devices, such as device(s) 102, that operate in a cluster or other grouped configuration to share resources, balance load, increase performance, provide fail-over support or redundancy, or for other purposes. Distributed computing resource(s) 406 can belong to a variety of categories or classes of devices such as traditional server-type devices, desktop computer-type devices, mobile-type devices, special purpose-type devices, embedded-type devices, and/or wearable-type devices. Thus, although illustrated as desktop computers, distributed computing resource(s) 406 can include a diverse variety of device types and are not limited to a particular type of device. Distributed computing resource(s) 406 can represent, but are not limited to, thin clients, desktop computers, server computers, web-server computers, personal computers, mobile computers, laptop computers, tablet computers, wearable computers, implanted computing devices, telecommunication devices, automotive computers, network enabled televisions, terminals, personal data assistants (PDAs), game consoles, gaming devices, work stations, media players, personal video recorders (PVRs), set-top boxes, cameras, integrated components for inclusion in a computing devices, appliances, or any other sort of computing device capable of connecting to other device(s) 408, such as device(s) 102, via a network connection 410.

In some examples, network connection 410 can be wired or wireless and, in response to device(s) 408 being discoverable via network connection 410, can be capable of data transmission from device(s) 408 to distributed service platform 402, and from distributed service platform 402 to device(s) 408.

In the illustrated example, distributed service platform 402 can include at least one reference user profile 412. In some examples, reference user profile 412 can store user profile data including but not limited to application specific data, website specific data, task context data, user preferences, and/or any other data associated with the profile of a user. The reference user profile 412 can store user profile data from at least one of a plurality of devices configured to a user profile. In some examples, the reference user profile 412 can serve as a central reference point of user profile data for the at least one of a plurality of devices in the task continuity system.

In the illustrated example, reference user profile 412 can include application(s) 414, such as applications 414(a)-(N). Application(s) 414 can further store task context data 416, such as task context data 416(a)-(N). Reference user profile 412 can also include a cross device activity module 418, configured to update a user profile through data transmission between device(s) 408 and distributed service platform 402. Based on the discoverability of device(s) 408, the cross device activity module 418 can regularly or periodically update the reference user profile 412. The update can be based at least upon application use, website use, and/or user preference changes on device(s) 408. The update from device(s) 408 to the reference user profile 412 can enable the distributed service platform 402 to maintain up-to-date reference user profile data. In some examples, the up-to-date reference user profile data can encompass the most updated task context data for tasks in applications and/or websites across any number of devices configured to the reference user profile.

Cross device activity module 418 can operably connect to device(s) 408 via network connection 410. In some examples, responsive to one or more device(s) 408 being discoverable (i.e. the device being powered on, the device being transitioned out of a low power state, airplane mode of the device being disabled, or any other input that causes the device to become discoverable to a network), cross device activity module 418 can pull user profile data from data storage on one or more device(s) 408. In some examples, cross device activity module 418 can pull user profile data from data storage on one or more device(s) 408 based upon the receipt of a task completion signal from the activity feed engine in the one or more device(s) 408.

In various examples, cross device activity module 418 can pull user profile data from data storage on one or more device(s) 408 at a periodic interval. In such an example, a task 416(*a*) in application 414(*a*) can be modified on device 408(1). During the modification, the application repository module can save the task context data for task 416(*a*) to the data storage in device 408(1). Periodically throughout the modification of the task 416(*a*), cross device activity module 418 can pull updated user profile data to include task context data of the task 416(*a*) from activity feed engine 420(1), such as activity feed engine 242, in device 408(1) over network connection 410. The cross device activity module 418 can save the updated user profile data in the application 414(*a*) of the reference user profile 412, thus enabling the most up-to-date reference user profile data. In some examples, the periodic interval can be any period of time, such as every 5 or 10 seconds, or any other period of time determined to be reasonable for an update. In some examples, the periodic interval can be a user specified time for updates, as set in user preferences at least in the reference user profile.

In some examples, in response to device(s) 408 being discoverable, cross device activity module 418 can send reference user profile data to. In such examples, in response to a device, such as device 408(2) being discoverable over network connection 410, the cross device activity module 418 can detect it. The cross device activity module 418 can compare the user profile on the device to the reference user profile 412. The cross device activity module 418 can push reference user profile data to the user profile data on the device to update the user profile on the device. Additionally, cross device activity module can pull user profile data from the device to update the reference user profile 412.

Cross device activity module 418, in another example, can push task context data explicitly to device(s) 408, such as devices 408(1) and 408(2), based on a command to push an update via a graphical user interface, such as graphical user interface 240. For example, a task 416(*a*) can be modified on a device 408(1), and a command can be given to the cross device activity module 418, via the activity feed engine 420(1), and network connection 410, to push the user profile data, including the updated task context data for task 416(*a*), to device 408(2). In such an example, the task 416(*a*) can be continued on device 408(1) and/or device 408(2), either separately or simultaneously.

Network environment 400 can also include proximity network 404 to enable data transmission between device(s) 408. In some examples, user profile data including but not limited to application specific data, website specific data, task context data, user preferences, and any other data associated with application and/or website use, can be shared between devices via a proximity network connection 424. Proximity network connection 424 can be a secure wired or wireless connection and can be capable of 2-way data transmission between device(s) 408, such as devices 408(1) and 408(2). In a proximity network, device(s) 408 can be discoverable to one another at least in proximity. Discoverability in a proximity network can be determined by a proximity interface within the device, such as proximity interface 214. The proximity interface can include proximity sensors, and/or wired connections. In some examples, the data sharing between devices can be explicit. In some examples, the data sharing between devices can be implicit.

In an explicit transmission, activity feed engines in the respective devices can push user profile data between devices 408(1) and 408(2), based at least in part on input on a graphical user interface, such as graphical user interface 240. For example, if a task 416(*a*) is being modified on device 408(1), and a user wants to modify the task 416(*a*) on device 408(2), the updated user profile data, including the task context data of task 416(*a*) can be pushed via input on a graphical user interface to device 408(2). In such an example, the respective activity feed engine(s) 420 in devices 408(1) and 408(2) would cause the user profile data to sync across the respective devices.

In an implicit transmission, in response to device(s) 408 being discoverable to one another, device(s) 408 can automatically transmit updated user profile data between device (s) 408. For example, device 408(2) can be a mobile device, and device 408(1) can be a stationary device. While traveling, application repository module on device 408(2) can save updated task context data of task 416(*a*) in data storage on device 408(2) to update the user profile. Then, responsive to device 408(2) being in proximity of device 408(1), activity feed engine 420 of device 408(2) can transmit updated user profile data, including task context data of task 416(*a*) over proximity network connection 424 to device 408(2), thereby enabling an updated user profile.

In various examples, respective application repository modules in devices 408(1) and 408(2) can save task context data of tasks 416(*a*) and 416(*b*) while they are viewed and/or modified on devices 408(1) and 408(2), respectively. Device 408(1) and device 408(2) becoming discoverable to one another can cause activity feed engine 420(1) to transmit updated user profile data from device 408(1), including task context data of task 416(*a*), and receive updated user profile data from device 408(2), including task context data of task 416(*b*). Concurrently, activity feed engine 420(2) can transmit updated user profile data from device 408(2), including task context data of task 416(*b*), and receive updated user profile data from device 408(1), including task context data of task 416(*a*).

In the illustrated example, network environment 400 includes a distributed service platform 402 and a proximity network 404. In such an environment, user profile data including application specific data, website specific data, task context data, user preferences, and/or any other data associated with application and/or website use, can be shared between devices using both the distributed service platform 402 and the proximity network 404. Thereby ensuring the reference user profile data and the user profile data across any number of devices contain the same data.

For example, if devices 408(1) and 408(2) are in proximity, but are unable to connect to distributed service platform 402 via network connection 410, devices 408(1) and 408(2) can transmit and receive update user profile data via the respective activity feed engines through proximity network connection 424. At a later time, device 408(1) is able to connect to distributed service platform 402 via network connection 410. Responsive to the connection, the cross device activity module 418 can recognize the discoverability of device 408(1), and pull user profile data including but not limited to application specific data, website specific data, task context data, user preferences, and any other data associated with application and/or website use, and update reference user profile 412 in distributed service platform 402. In another example, the user can push user profile data from device 408(1) to distributed service platform 402 after acquiring network connection 410. A user may then pick up any device(s) 408 and continue a task on any application and/or website in the reference user profile 412.

Illustrative Processes

Figure 5:
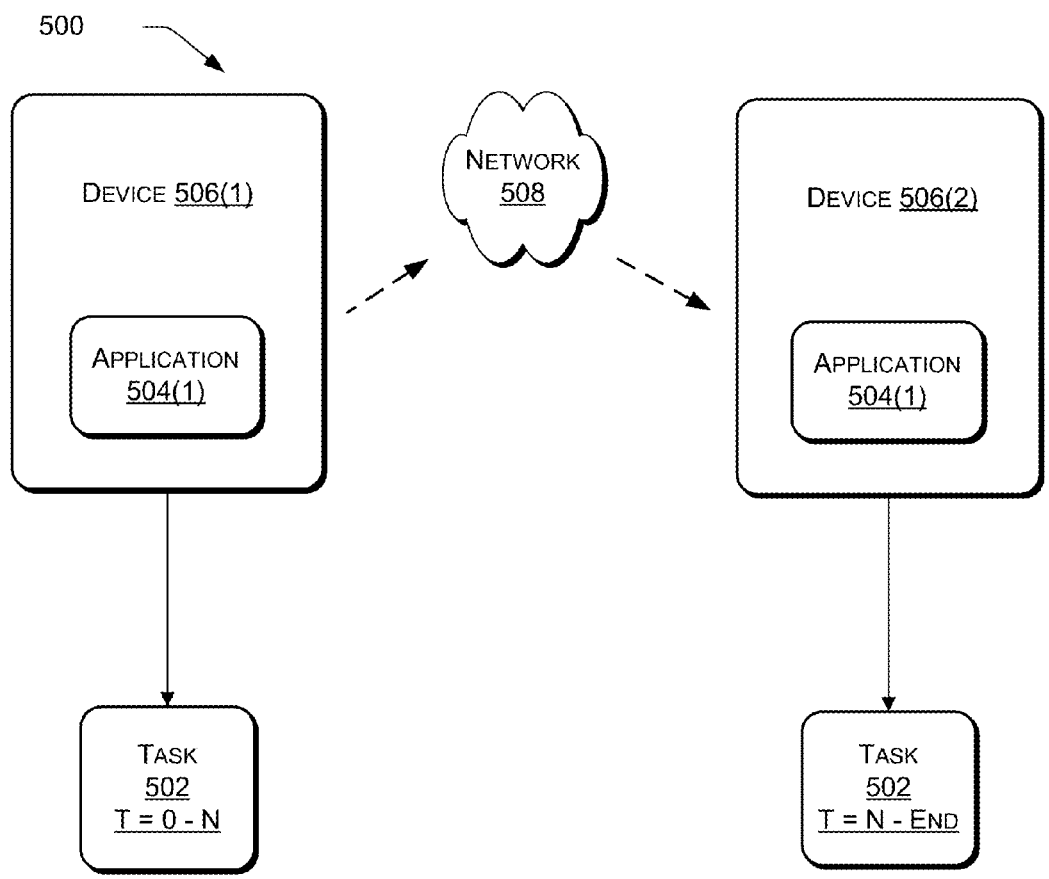
FIG. 5 illustrates an example process of the cross device and/or cross operating system task continuity system consistent with the preceding figures.

FIG. 5 illustrates an example process of a cross device and/or cross operating system task continuity system consistent with the preceding figures.

In the illustrated example, a task 502 can be presented and/or modified at time, T=0 in application 504(1) on device 506(1), such as device 102(1). The task 502 can continue to be presented and/or modified until time, T=N. At time T=N, task 502 can be stopped in application 504(1) on device 506(1). Also at T=N, task 502 can be presented and/or modified in application 504(2) on device 506(2), such as device 102(2).

In some examples, application 504(1) on device 506(1) can be the same application as application 504(2) on device 506(2). In various examples, application 504(1) on device 506(1) can be a different application than application 504(2) on device 506(2).

In an illustrative example, task 502 can be presented and/or modified on device 506(1) until time, T=N. On device 506(2) task 502 can be presented and/or modified from time, T=N until the completion of the task 502. The completion of the task 502 can be designated by user input via an input interface and/or by the application and/or website. In some examples, responsive to completion of the task 502, an activity feed engine in device 506(2) can send a task completion signal across the plurality of devices and/or to the reference user profile in the distributed service platform via network 508. Network 508 can be comprised of a distributed service platform and/or a proximity network. In various examples, data can be transmitted via any other network platform.

In various examples, the task completion signal can update the user profiles in each of the plurality of devices and/or the reference user profile, such that the task can be removed from the plurality of recently viewed and/or modified tasks. The removal of the task from the plurality of recently viewed and/or modified tasks can be based at least in part on the type of task, type of application and/or website, and/or user settings. For example, task 502 can be an email for which composition was started on device 506(1), and the composition was completed on device 506(2). Once composition of the email is complete and the email is sent a sent version can be saved by the email provider. Therefore, the email can be removed from the plurality of recently presented and/or modified tasks without any degradation to task continuity.

In some examples, completing a task can cause the task to transition into another state. In an illustrative example, application 504(1) can be a mapping application on device 506(1), which can be a desktop computer. Task 502 can be a set of driving directions. Device 506(2) can be a smartphone, and can display task 502 on the mapping application. Responsive to arrival at the destination, the user and/or the application 504(2) can designate completion of the task. Responsive to task completion, the activity feed engine on device 506(2) can send a task completion signal across the plurality of devices and/or to the reference user profile. The task completion signal can then prompt the task 502 to transition to a new set of directions, such as return directions on one or both of device 506(1) and/or 506(2).

In various examples, completion of a task and/or the activity feed engine on device 506(2) sending a task completion signal across the plurality of devices and/or to the reference user profile can prompt a new task 502 associated with the completed task on one or more of devices 506. Responsive to task completion, the activity feed engine on device 506(2) can prompt for a new task related to the completed task and/or the context of the completed task in the same or a different application. For example, responsive to arrival at the destination as discussed above, the user and/or the application 504(2) can designate completion of the task. Responsive to task completion, the activity feed engine on device 506(2) can prompt for a new task 502, which can be presentation of a listing of businesses or activities associated with the destination. In some examples, the new task 502 may be presented on device 506(2) without being presented on device 506(1) until device 506(1) is in proximity to device 506(2).

Figure 6:
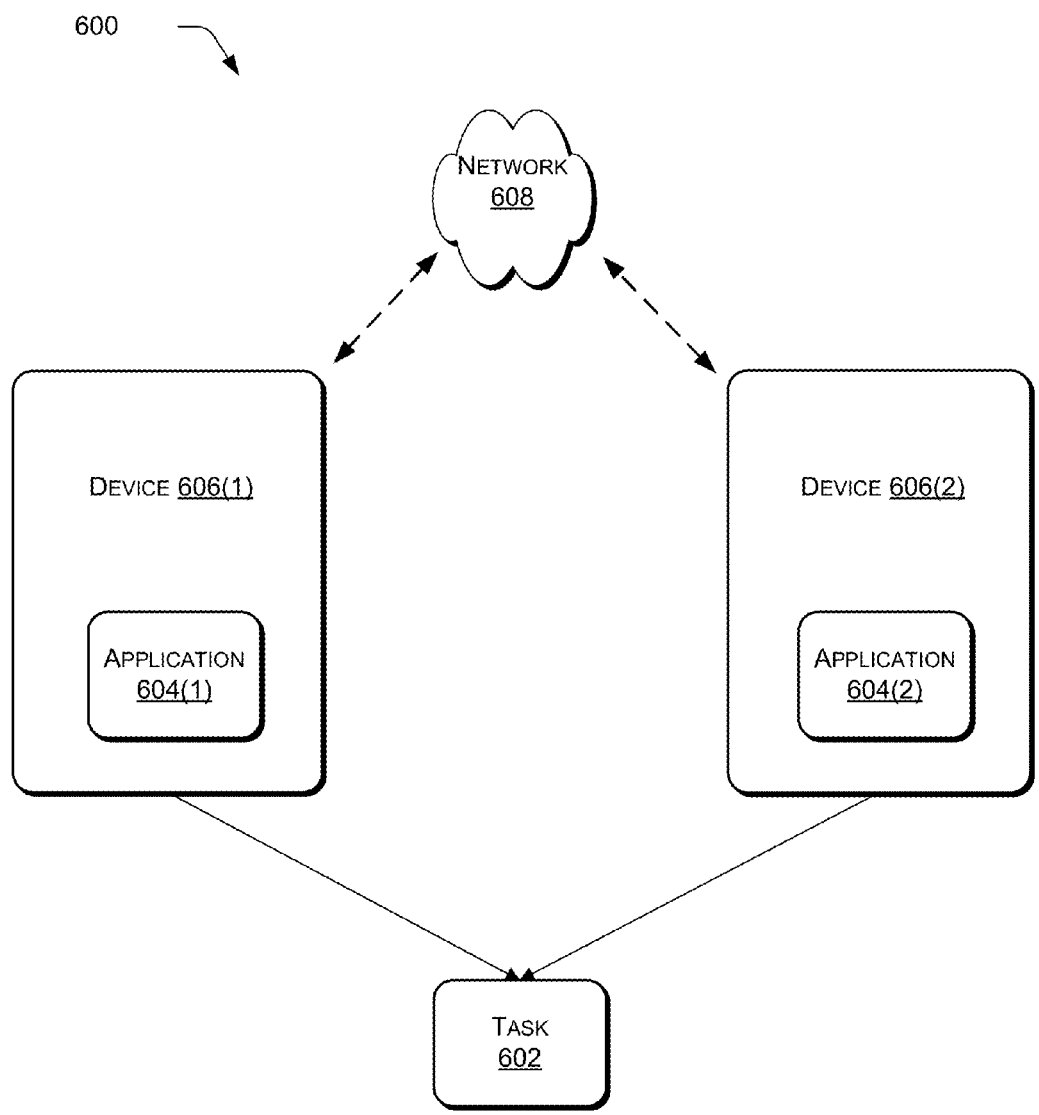
FIG. 6 illustrates another example process of the cross device and/or cross operating system task continuity system consistent with FIGS. 1-4.

FIG. 6 illustrates another example process of the cross device and/or cross operating system task continuity system consistent with FIGS. 1-4.

In the illustrated example, a task 602 can be presented and/or modified in application 604(1) on device 606(1), such as device 102(1). Simultaneously, the task 602 can be presented and/or modified in application 604(2) on device 606(2), thereby enabling the presentation and/or modification of task 602 on at least two device(s) 606.

In some examples, application 604(1) on device 606(1) can be the same application as application 604(2) on device 606(2). In various examples, application 604(1) on device 606(1) can be a different application than application 604(2) on device 606(2).

In some examples, user profile data including application specific data, website specific data, task context data, user preferences, and/or any other data associated with application and/or website use can be transmitted via network 608, such as distributed service platform 402 and/or proximity network 404.

Figure 7:
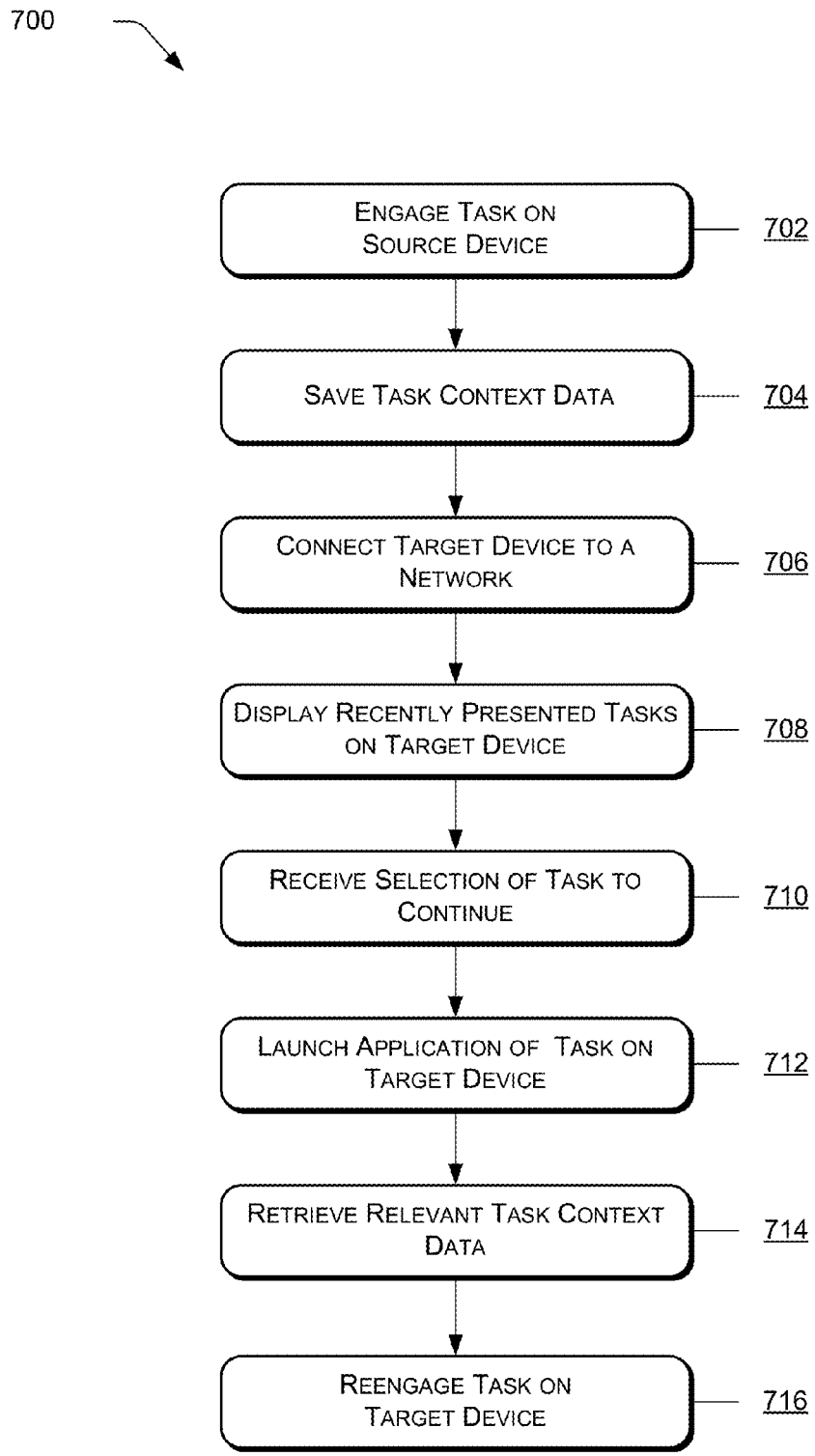
FIG. 7 illustrates a process flow on the cross device and/or cross operating system task continuity system consistent with the preceding figures.
Figure 8:
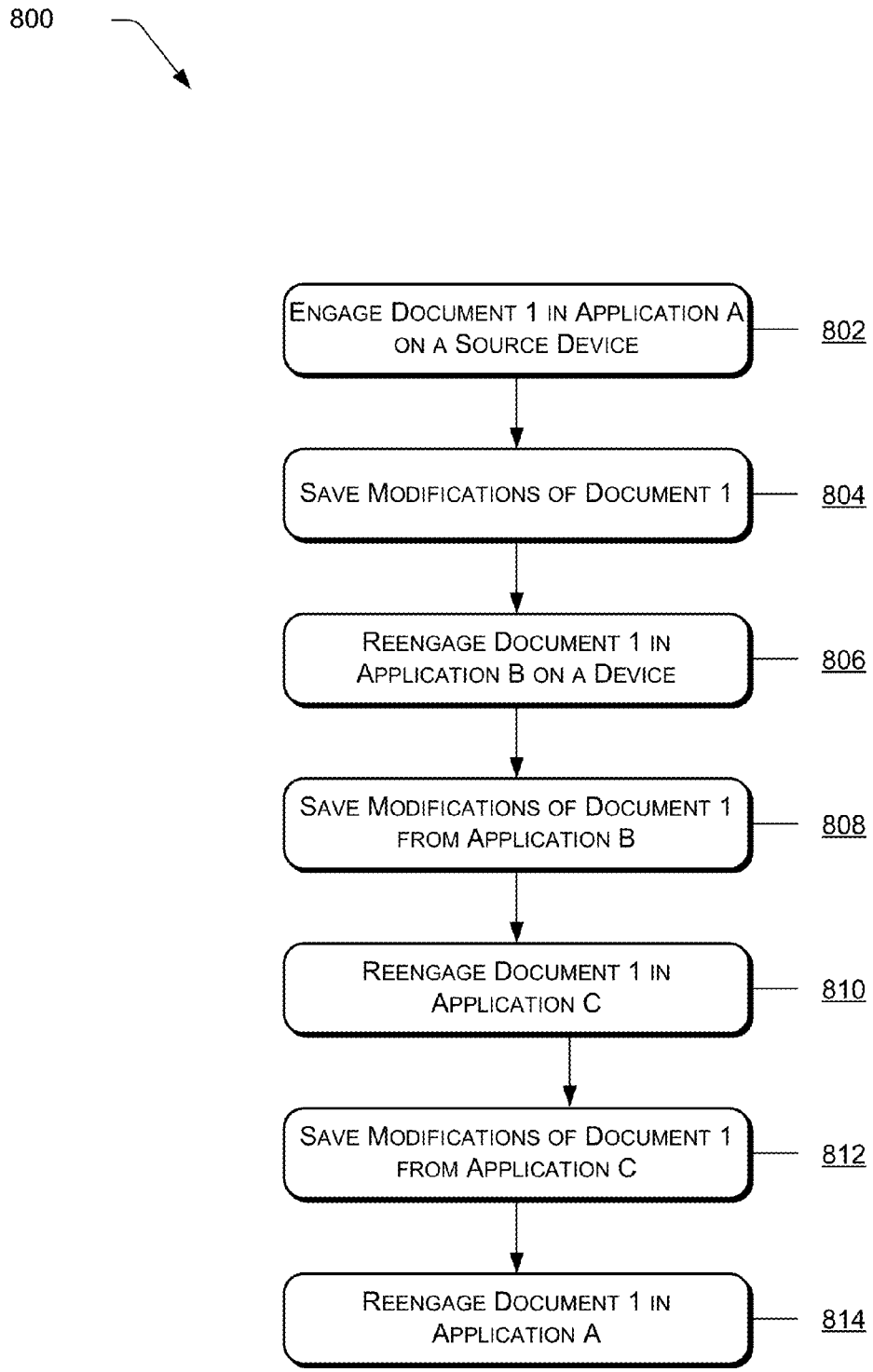
FIG. 8 illustrates a process flow for cross application task modification with the cross device and/or cross operating system task continuity system consistent with the preceding figures.

FIGS. 7 and 8 are flow diagrams depicting example processes for a cross device and/or cross operating system task continuity system. The operations of the example process are illustrated in individual blocks and summarized with reference to those blocks. The process is illustrated as logical flows of blocks, each block of which can represent one or more operations that can be implemented in hardware, software, or a combination thereof.

FIG. 7 illustrates a process flow on a cross device and/or cross operating system task continuity system consistent with the preceding figures. FIG. 7 illustrates a process flow in which there is one source device and one target device, although this is just an example, and there may be more than one source device and/or more than one target device.

At block 702, an activity feed engine engages a task on a source device, such as device 102, 200, 408, 506, and/or 606.

At block 704, the activity feed engine saves task context data to the user profile at least on the source device. In some examples, a cross device activity module, such as cross device activity module 418, in a distributed service platform, can pull the updated user profile data from the source device and save it in a reference user profile.

In block 706, the I/O interface discovers connection of a target device to a network. In some examples, making a device discoverable in a network can include the device being powered on, the device being transitioned out of a low power state, airplane mode of the device being disabled, or any other input that causes the device to become discoverable to a network. In various examples, devices can be discoverable and the respective activity feed engines in the devices can transmit and receive user profile data between the source and target devices. In at least one example, responsive to discoverability, respective activity feed engines can transmit and receive user profile data between the source and target devices and a cross device activity module.

In some examples, the transmission of user profile data from the source device to the target device and/or cross device activity module can be implicit. In various examples, the transmission of task context data from the source device to the target device and/or cross device activity module can be explicit.

In block 708, a display module can cause display the previously presented task on an interactive thumbnail display on the target device. In some examples, the display module can display one or more relevant task context data of previously presented and/or modified tasks, application and/or website specific data, application suggested user actions, and application promotions.

In block 710 a graphical user interface via an I/O interface input can receive a selection of the previously presented task. In some examples, the selection can be of at least one of an application suggested user action or an application promotion.

In block 712, the activity feed engine launches an application on the target device, respective to the task selection in block 710. In some examples, the activity feed engine can launch the same application in which the task was last presented and/or modified on the source device. In some examples, the activity feed engine can launch a different application which is compatible with the application in which the task was last presented and/or modified on the source device. In various examples, the activity feed engine can launch a website which is compatible with the application in which the task was last presented and/or modified on the source device.

In block 714, an application repository module retrieves relevant task context data from the user profile in data storage, to enable seamless reengagement of the task on an application and/or website on the target device, such as in block 716.

FIG. 8 illustrates a process flow for cross application task modification with the cross device and/or cross operating system task continuity system consistent with the preceding figures.

In block 802, an activity feed engine via input to an I/O interface associated with a graphical user interface engages a document 1 in a first application, such as application A for a display module to cause display of the document for viewing and/or modification on a source device, such as device 102(1), 200, 408, 506, and/or 606. In some examples, the activity feed engine can engage the document 1 on a website on the source device.

In block 804, in various examples, the activity feed engine can implicitly and/or explicitly cause the document 1 to be saved to a user profile in the source device, such as device 102(1) or any of the previously described devices. In some examples, an activity feed engine in the source device can implicitly and/or explicitly cause the document 1 to be saved to a user profile in a target device, such as device 102(2) or any other of the previously described devices via a proximity network. In some examples, the activity feed engine can implicitly and/or explicitly cause the document 1 to be saved in a reference user profile via a cross device activity module. In various examples, the activity feed engine can implicitly and/or explicitly cause document 1 to be saved to the user profile in the source device, to the user profile in the target device, and to the reference user profile in the distributed service platform.

In block 806, the activity feed engine via a graphical user interface reengages the document 1 in a second application, such as application B, and a display module can display the document 1 for viewing and/or modification in the second application. Responsive to reengagement, document 1 task context data can be presented, including task content data added from the first application. In some examples, the activity feed engine can reengage document 1 in the second application on the source device. In various examples, the activity feed engine can reengage document 1 in the second application on a target device.

In block 808, in some examples, the activity feed engine can implicitly and/or explicitly save the document 1 to a user profile in the source device, such as device 102(1) or any of the previously described devices. In some examples, an activity feed engine in the source device can implicitly and/or explicitly save the document 1 to a user profile in a target device, such as device 102(2) or any other of the previously described devices via a proximity network. In some examples, the activity feed engine can implicitly and/or explicitly save the document 1 in a reference user profile via a cross device activity module. In various examples, the activity feed engine can implicitly and/or explicitly save document 1 to the user profile in the source device, the user profile in the target device and to the reference user profile in the distributed service platform.

In block 810, the activity feed engine via a graphical user interface reengages the document 1 in a third application, such as application C, and a display module can cause display the document 1 for viewing and/or modification in the third application. Responsive to reengagement, document 1 task context data can be presented, including task content data added from the first and second applications. In some examples, the activity feed engine can reengage document 1 in the third application on the source device. In various examples, the activity feed engine can reengage document 1 in the third application on a target device. In some examples, the target device may be the same device as used in block 806, or it can be a different device, such as device 102(N).

In block 812, in some examples, the activity feed engine can implicitly and/or explicitly save the document 1 to a user profile in the source device, such as device 102(1). In some examples, an activity feed engine in the source device can implicitly and/or explicitly save the document 1 to a user profile in a target device, such as device 102(2) via a proximity network. In some examples, the activity feed engine can implicitly and/or explicitly save the document 1 in a reference user profile via a cross device activity module. In various examples, the activity feed engine can implicitly and/or explicitly save document 1 to the user profile in the source device, the user profile in the target device and to the reference user profile in the distributed service platform.

In block 814, the activity feed engine via a graphical user interface reengages the document 1 in the first application. Responsive to reengagement document 1 task context data can be presented, including task content data added from the first, second, and third applications. In some examples, the activity feed engine can reengage document 1 in the first application on the source device, such as device 102(1) or any of the previously described devices. In various examples, the activity feed engine can reengage document 1 in the first application on a target device, such as devices 102(2)-102(N) or any other of the previously described devices.

In the context of software, the operations represent computer-executable instructions stored on one or more computer-readable storage media that, when executed by one or more processors, enable the one or more processors to perform the recited operations. Generally, computer-executable instructions include routines, programs, objects, modules, components, data structures, and the like that perform particular functions or implement particular abstract data types. The process can also be practiced in a distributed computing environment where functions are performed by remote processing devices that are linked through a communication network. In a distributed computing environment, computer-executable instructions can be located in local and/or remote computer storage media, including memory storage devices.

In the context of hardware, some or all of the blocks can represent application specific integrated circuits (ASICs) or other physical components that perform the recited operations.

The order in which the operations are described is not intended to be construed as a limitation, and any number of the described operations can be executed in any order, combined in any order, subdivided into multiple sub-operations, and/or executed in parallel to implement the described process.

Example Clauses

A: A method comprising: connecting a first device configured to a user profile and a second device configured to a user profile to one or more networks; running a first task on an application on the first device, the application containing a first task context data comprised at least in part on a most recent user input; saving the first task context data as a first user profile update in a data storage on the first device; displaying on the second device a plurality of recently viewed tasks including the first task; selecting the first task on the second device; launching an application on the second device based at least in part on the selecting the first task; running the first task on the application on the second device, the application on the second task including the first context data; and saving a second context data to as a second user profile update in a data storage on the second device.

B: A method as paragraph A describes, wherein the application on the first device and the application on the second device are the same application.

C: A method as paragraph A describes, wherein the application on the first device is configured as an application and the application on the second device configured as a web browser.

D: A method as paragraph A describes, wherein the first device is configured on an operating system and the second device are configured on the same operating system.

E: A method as paragraph A describes, wherein the first device is configured on a first operating system and the second device is configured on a second operating system, the second operating system being different than the first operating system.

F: A method as any of paragraphs A-E describes, wherein the one or more networks is comprised of at least a distributed service platform.

G: A method as paragraph F describes, wherein the distributed service platform is further comprised of: a reference user profile; and a cross device activity module configured to transmit and receive the user profile data from at least one of a plurality of devices configured to the user profile.

H: A method as any of paragraphs A-E describes, wherein the one or more networks is comprised of at least a proximity network architecture.

I: A method as any of paragraphs A-H describes, wherein the display of at least one of a plurality of recently viewed tasks further includes application specific data, the application specific data being based at least in part on running the first task on the application on the first device and comprising at least one of: an application suggested user action; and/or an application promotion.

J: A method as any of paragraphs A-I describes, wherein the running the first task on the application on the first device happens consecutively with the running the first task on the application on a second device.

K: A computer-readable medium having thereon computer-executable instructions that responsive to execution configure a computer to perform a method as any one of paragraphs A-J describes.

L: A device or system comprising: a processor; and a computer-readable medium coupled to the processor, the computer-readable medium including instructions to configure one or more devices to perform a method as any of paragraphs A-J describes.

M: A device or system comprising: means for processing; and means for storing coupled to the means for processing, the means for storing, storing instructions to configure one or more devices to perform a method as any of paragraphs A-J describes.

N: A method comprising: configuring a first device and a second device to a reference user profile in a distributed service platform; running a first task on an application on the first device, the application containing a first task context data comprised of at least a most recent user input; saving the first task context data to a first user profile in a data storage on the first device; connecting, via a network connection, the first device to the reference user profile in the distributed service platform; sending the first user profile update to the reference user profile; updating the reference user profile, such that the first user profile and the reference user profile contain the same data; connecting the second device to the reference user profile in the distributed service platform; sending the reference user profile to a second user profile in a data storage on the second device; updating the second user profile, such that the second user profile and the reference user profile contain the same data; displaying on the second device at least one of a plurality of recently viewed tasks, the plurality of recently viewed tasks including at least the first task; selecting the first task on the second device; launching an application on the second device based at least in part on the selecting the first task; running the first task on the application on the second device, the application containing the first task context data; and updating the second user profile, based at least in part on a user input on the second device.

O: A method as paragraph N describes, wherein the displaying on the second device at least one of a plurality of recently viewed tasks is configured in a ranking structure, the ranking structure being based on at least a the time at which each one of the plurality of recently viewed tasks was last viewed by a user.

P: A method as either paragraph N or O describes, wherein the ranking structure is further based on at least one of: a user preference; an application use frequency; an application viewing duration; a website use frequency; a website viewing duration; an application user suggested action; and/or an application promotion.

Q: A method as any of paragraphs N-P describes, further comprising: configuring a third device to a user profile; connecting the second device and the third device to a proximity network via a proximity network connection; sending the second user profile update from the second device to the third device via the proximity network connection; updating the user profile on the third device, such that the user profile on the second device and the user profile on the third contain the same data; displaying on the third device at least one of a plurality of recently viewed tasks, the plurality of recently viewed tasks including at least the first task; selecting the first task on the third device; launching an application on the third device based at least in part on the selecting the first task; running the first task context data on the application on the third device; and updating the user profile on the third device.

R: A method as any of paragraphs N-Q describes, further comprising: completing the first task on the second device; sending a task completion signal to the reference user profile, the user profile on the first device, and/or the user profile on the second device; deleting the task from the reference user profile, the user profile on the first device, and/or the user profile on the second device, responsive to receipt of the task completion signal.

S: A computer-readable medium having thereon computer-executable instructions that responsive to execution configure a computer to perform a method as any one of paragraphs N-R describes.

T: A device or system comprising: a processor; and a computer-readable medium coupled to the processor, the computer-readable medium including instructions to configure one or more devices to perform a method as any of paragraphs N-R describes.

U: A device or system comprising: means for processing; and means for storing coupled to the means for processing, the means for storing, storing instructions to configure one or more devices to perform a method as any of paragraphs N-R describes.

V: A computer readable medium having thereon computer-executable instructions, the computer-executable instructions responsive to execution configuring a device to perform operations comprising: identifying a plurality of tasks on a plurality of applications in a user profile, the user profile being comprised of user profile data; identifying the time at which each one of the plurality of tasks was last viewed by a user on the device; ranking the plurality of tasks on the plurality of applications, based at least in part on the time at which each one of the plurality of tasks was last viewed by a user; providing for display at least one of the plurality of tasks based at least in part on the ranking; receiving selection of a particular task from the plurality of tasks displayed; modifying the particular task; saving a task context data for the particular task to data storage, the task context data including at least the modification of the particular task; and updating the user profile data with the task context data of the particular task.

W: A computer-readable medium as paragraph V describes, wherein the ranking is further based on at least one of: a user preference, an application use frequency, an application viewing duration, a website use frequency, a website viewing duration, an application user suggested action, and/or an application promotion.

X: A computer-readable medium as either paragraph V or W describes, the acts further comprising: connecting the device to a distributed service platform comprising at least: a reference user profile configured to store reference user profile data, and a cross device activity module; sending the user profile data from the device to the reference user profile to update the reference user profile data with the user profile data, such that a reference user profile and the user profile contain the same data.

Y: A computer-readable medium as any of paragraphs V-X describes, the acts further comprising: connecting a second device to the distributed service platform, wherein the second device is configured to the reference user profile and contains a second user profile in a second data storage configured to store user profile data; sending the reference user profile data to the second user profile; and updating the second user profile data with the reference user profile data, such that the second user profile data includes at least the task context data for the particular task.

Z: A computer readable medium as any of paragraphs V-Y describes, the acts further comprising: connecting the device to a second device in a proximity network; sending the user profile data from the device to a data storage in the second device; and updating a second user profile data on the second device with the user profile data from the device.

AA: A device or system comprising: a processor; and a computer-readable medium as any of paragraphs V-Z describes coupled to the processor.

AB: A device comprising: a reference user profile, the reference user profile configured to store at least a set of user preferences and task context data; a cross device activity module, the cross device activity module to: connect to one or more devices over a network; receive task context data from at least one of a plurality of devices; saving the task context data to the reference user profile; and send the task context data to at least one of a plurality of devices.

AC: A device comprising: a user profile, the user profile configured to store at least a set of user preferences and task context data; a plurality of applications, the applications configured to store application specific data; an activity feed engine, the activity feed engine to: connect to one or more devices over a network; receive task context data from at least one of a plurality of devices; save the task context data to a user profile in a data storage; and send the task context data to a second device.

AD: A device as paragraph AC describes, the activity feed engine further to: receive a task completion signal; and responsive to receiving the task completion signal, to remove the task context data from the user profile in the data storage.

AE: A device as either paragraph AC or AD describes, the activity feed engine further to: receive a task completion signal; and responsive to receiving the task completion signal, to launch a new task on an application based at least in part on the receiving the task completion signal; and to run the new task on an application on the device.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

Conditional language such as, among others, "can," "could," "might" or "may," unless specifically stated otherwise, are otherwise understood within the context as used in general to present that certain examples include, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate examples are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A method comprising:
   connecting a first device to one or more networks, the first device configured to a user profile;
   running a first task on an application on the first device, the application on the first device including a first task context data, wherein the first task context data is comprised at least in part of a most recent user input;
   saving the first task context data as a first user profile update in a data storage on the first device, the data storage being configured to store user profile data;
   connecting a second device to the one or more networks, the second device configured to the user profile;
   displaying on the second device at least one task of a plurality of recently viewed tasks, the at least one task of a plurality of viewed tasks including at least the first task;
   selecting the first task on the second device;
   launching an application on the second device based at least in part on the selecting the first task;
   running the first task on the application on the second device, the application on the second device including the first context data; and
   saving a second context data as a second user profile update in a data storage on the second device, the data storage on the second device being configured to store user profile data.

2. A method as claim 1 recites, wherein the application on the first device and the application on the second device are the same application.

3. A method as claim 1 recites, wherein the application on the first device is configured as an application and the application on the second device is configured as a web browser.

4. A method as claim 1 recites, wherein the first device is configured with an operating system and the second device is configured with the operating system.

5. A method as claim 1 recites, wherein the first device is configured on a first operating system and the second device is configured on a second operating system, the second operating system being different than the first operating system.

6. A method as claim 1 recites, wherein the one or more networks is comprised of at least a distributed service platform.

7. A method as claim 6 recites, wherein the distributed service platform is further comprised of:
   a reference user profile; and
   a cross device activity module, the cross device activity module configured to transmit and receive the user profile data from at least one of a plurality of devices configured to the user profile.

8. A method as claim 1 recites, wherein one or more networks is comprised of at least a proximity network architecture.

9. A method as claim 1 recites, wherein the displaying of at least one of a plurality of recently viewed tasks further includes displaying application specific data, the application specific data being based at least in part on running a first task on an application on the first device and comprising at least one of:
   an application suggested user action; and
   an application promotion.

10. A method as claim 1 recites, wherein the running the first task on an application on the first device happens concurrently with the running the first task on an application on a second device.

11. A method as claim 1 recites, wherein the running the first task on the application on the first device happens consecutively with the running the first task on the application on the second device.

12. A method comprising:
    configuring a first device and a second device to a reference user profile in a distributed service platform;
    running a first task on an application on the first device, the application on the first device containing a first task context data, wherein the first task context data is comprised at least in part of a most recent user input;
    saving the first task context data to a first user profile in a data storage on the first device;
    connecting the first device to the reference user profile in the distributed service platform via a network connection;
    sending the first user profile update to the reference user profile;
    updating the reference user profile, such that the first user profile and the reference user profile contain the same data;
    connecting the second device to the reference user profile in the distributed service platform via the network connection;
    sending the reference user profile to a second user profile in a data storage on the second device,
    updating the second user profile, such that the second user profile and the reference user profile contain the same data;
    displaying on the second device at least one of a plurality of recently viewed tasks, the plurality of recently viewed tasks including at least the first task;
    selecting the first task on the second device;
    launching an application on the second device based at least in part on the selecting the first task;
    running the first task context data on the application on the second device; and updating the second user profile based at least in part on a user input on the second device.

13. A method as claim 12 recites, wherein the displaying on the second device at least one of a plurality of recently viewed tasks is configured in a ranking structure, the ranking structure being based on at least a time at which each one of the plurality of recently viewed tasks was last viewed by a user.

14. A method as claim 13 recites, wherein the ranking structure is further based on at least one of:
   a user preference;
   an application use frequency;
   an application viewing duration;
   a website use frequency;
   a website viewing duration;
   an application user suggested action; or
   an application promotion.

15. A method as claim 12 recites, further comprising:
   configuring a third device to a user profile;
   connecting the second device and the third device to a proximity network via a proximity network connection;
   sending the second user profile update from the second device to the third device via the proximity network connection;
   updating the user profile on the third device, such that the user profile on the second device and the user profile on the third contain the same data;
   displaying on the third device at least one of a plurality of recently viewed tasks, the at least one of a plurality of recently viewed tasks including at least the first task;
   selecting the first task on the third device;
   launching an application on the third device based at least in part on the selecting the first task;
   running the first task context data on the application on the third device; and
   updating the user profile on the third device.

16. A method as claim 12 recites, further comprising:
   completing the first task on the second device;
   sending a task completion signal to the reference user profile and the user profile on the first device,
   deleting the task from the reference user profile, the user profile on the first device, and the user profile on the second device, responsive to receipt of the task completion signal; and
   updating the reference user profile, the user profile on the first device, and the user profile on the second device.

17. A computer-readable memory storage device having thereon computer-executable instructions the computer-executable instructions responsive to execution configuring a device to perform operations comprising:
   identifying a plurality of tasks on a plurality of applications associated with a user profile, the user profile being comprised of user profile data;
   identifying the time at which each one of the plurality of tasks was last viewed by a user on the device;
   ranking the plurality of tasks on the plurality of applications, based at least in part on the time at which each one of the plurality of tasks was last viewed by the user;
   providing for display at least one of the plurality of tasks based at least in part on the ranking;
   receiving selection of a particular task from the plurality of tasks displayed;
   modifying the particular task;
   saving a task context data for the particular task to a data storage, the task context data including at least the modification of the particular task; and
   updating the user profile data with the task context data of the particular task.

18. A computer-readable memory storage device as claim 17 recites, the operations further comprising:
   connecting the device to a distributed service platform, the distributed service platform comprising at least:
      a reference user profile configured to store reference user profile data; and
      a cross device activity module; and
   sending the user profile data from the device to the reference user profile to update the reference user profile data with the user profile data, such that the reference user profile and the user profile contain the same data.

19. A computer-readable memory storage device as claim 17 recites, the operations further comprising:
   connecting a second device to the distributed service platform, wherein the second device is configured to the reference user profile and contains a second user profile in a second data storage, the second user profile configured to store user profile data;
   sending the reference user profile data to the second user profile; and
   updating the second user profile data with the reference user profile data, such that the second user profile data includes at least the task context data for the particular task.

20. A computer readable memory storage device as claim 17 recites, the operations further comprising:
   connecting the device to a second device in a proximity network;
   sending the user profile data from the device to a data storage in the second device; and
   updating a second user profile data on the second device with the user profile data from the device.

* * * * *